United States Patent
Lu

(10) Patent No.: US 11,924,520 B2
(45) Date of Patent: Mar. 5, 2024

(54) SUBTITLE BORDER-CROSSING PROCESSING METHOD AND APPARATUS, AND ELECTRONIC DEVICE

(71) Applicant: BEIJING BYTEDANCE NETWORK TECHNOLOGY CO., LTD., Beijing (CN)

(72) Inventor: Yongchen Lu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 262 days.

(21) Appl. No.: 17/616,954

(22) PCT Filed: Jun. 3, 2020

(86) PCT No.: PCT/CN2020/094191
§ 371 (c)(1),
(2) Date: Dec. 6, 2021

(87) PCT Pub. No.: WO2020/244553
PCT Pub. Date: Dec. 10, 2020

(65) Prior Publication Data
US 2022/0248102 A1    Aug. 4, 2022

(30) Foreign Application Priority Data
Jun. 6, 2019 (CN) .......................... 201910493548.7

(51) Int. Cl.
*H04N 21/435* (2011.01)
*H04N 21/258* (2011.01)
(Continued)

(52) U.S. Cl.
CPC ... *H04N 21/4884* (2013.01); *H04N 21/25825* (2013.01); *H04N 21/435* (2013.01); *H04N 21/4402* (2013.01)

(58) Field of Classification Search
CPC ......... H04N 21/4884; H04N 21/25825; H04N 21/435; H04N 21/4402
See application file for complete search history.

(56) References Cited

U.S. PATENT DOCUMENTS 10,860,273 B2 * 12/2020 Han ................ H04N 21/43076
2008/0292272 A1 * 11/2008 Yamazaki ............ H04N 21/47
386/E5.034
(Continued)

FOREIGN PATENT DOCUMENTS

| CN | 101064177 A | 10/2007 |
|---|---|---|
| CN | 101668132 A | 3/2010 |

(Continued)

*Primary Examiner* — Thai Q Tran
*Assistant Examiner* — Jose M Mesa
(74) *Attorney, Agent, or Firm* — BakerHostetler

(57) ABSTRACT

A method, an apparatus and an electronic device for processing a subtitle beyond scope are provided. In the method, size information of a display device of a terminal is acquired, where the size information indicates a size of the display device. A secure zone is established according to the size information, where the secure zone has a size less than or equal to the size of the display device. A video frame is selected from video images in response to playing the video images by the terminal. A composite frame is generated using parts of the video frame that are beyond the secure zone. It is judged whether the composite frame contains text. It is determined that a subtitle in the video images is beyond scope if the composite frame contains text.

20 Claims, 6 Drawing Sheets

(51) Int. Cl.
 *H04N 21/4402* (2011.01)
 *H04N 21/488* (2011.01)

(56) References Cited

U.S. PATENT DOCUMENTS

| | | | |
|---|---|---|---|
| 2016/0029016 A1 | 1/2016 | Yoo et al. | |
| 2016/0042494 A1* | 2/2016 | Baek | H04N 5/445 |
| | | | 348/468 |
| 2016/0373714 A1* | 12/2016 | Lee | H04N 13/183 |
| 2017/0277661 A1 | 9/2017 | Lee et al. | |

FOREIGN PATENT DOCUMENTS

| | | |
|---|---|---|
| CN | 102082930 A | 6/2011 |
| CN | 102082931 A | 6/2011 |
| CN | 102088571 A | 6/2011 |
| CN | 102111601 A | 6/2011 |
| CN | 103700360 A | 4/2014 |
| CN | 106210838 A | 12/2016 |
| CN | 106657965 A | 5/2017 |
| CN | 108769821 A | 11/2018 |
| CN | 109743613 A | 5/2019 |
| CN | 110177295 A | 8/2019 |
| EP | 2595044 A1 | 5/2013 |
| JP | 2009-216815 A | 9/2009 |
| JP | 4552426 B2 | 9/2010 |
| JP | 2013-040976 A | 2/2013 |
| JP | 2013-255123 A | 12/2013 |
| JP | 2018-152026 A | 9/2018 |

\* cited by examiner

SUBTITLE BORDER-CROSSING PROCESSING METHOD AND APPARATUS, AND ELECTRONIC DEVICE

REFERENCE TO RELATED APPLICATION

This application is the national phase of International Patent Application No. PCT/CN2020/094191, titled "SUBTITLE BORDER-CROSSING PROCESSING METHOD AND APPARATUS, AND ELECTRONIC DEVICE", filed on Jun. 3, 2020, which claims priority to Chinese Patent Application No. 201910493548.7, titled "SUBTITLE BORDER-CROSSING PROCESSING METHOD AND APPARATUS, AND ELECTRONIC DEVICE", filed on Jun. 6, 2019 with the China National Intellectual Property Administration, both of which are incorporated herein by reference in their entireties.

FIELD

The present disclosure relates to the field of image processing technology, and in particular to a method, an apparatus and an electronic device for processing a subtitle beyond scope.

BACKGROUND

With the development of communication technology, various terminal devices, such as smart phones, tablet computers and notebook computers, become more and more important for people.

At present, the terminal devices have entertainment functions. For example, smart phones, tablet computers or the like can play multimedia files, such as videos and audios. Nowadays, there are often subtitles in a video, and the positions of the subtitles are not fixed and can be located anywhere in the video. In some cases, when a video recorded by a user is played by a terminal device, some subtitles are beyond scope of the screen if the size of the video does not match the screen size of the terminal, which affects the viewing effect. FIG. 1 shows an example of a subtitle beyond scope of the screen. In this example, the video includes the subtitle o我是中国人 (Chinese for "I am a Chinese man"), but the word 我 (Chinese word for "I") is only partially displayed because the size of the video is larger than the size of the terminal device. The terminal device does not detect that the subtitle is beyond the scope of the screen, which affects the experiences of watching the video. In the conventional technology, the user is generally required to determine whether a subtitle is beyond the scope, and then adjust the resolution of the screen or adjust the size of the subtitle or the size of the video to solve the problem, which is inconvenient.

SUMMARY

According to an aspect of the present disclosure, the following technical solutions are provided.

A method for processing a subtitle beyond scope includes:
acquiring size information of a display device of a terminal, where the size information indicates a size of the display device;
establishing a secure zone according to the size information, where the secure zone has a size less than or equal to the size of the display device;
selecting a video frame from video images in response to playing the video images by the terminal;
generating a composite frame using parts of the video frame that are beyond the secure zone;
judging whether the composite frame contains text; and
determining that a subtitle in the video images is beyond scope if the composite frame contains text.

Furthermore, the method may further include:
reducing a size of the subtitle to display the subtitle in the secure zone when determining that the subtitle in the video images is beyond scope.

Furthermore, the acquiring size information of a display device of a terminal, where the size information indicates a size of the display device may include:
acquiring a display attribute of the terminal, where the display attribute includes a height of the display device and a width of the display device.

Furthermore, the establishing a secure zone according to the size information, where the secure zone has a size less than or equal to the size of the display device may include:
calculating a width of the secure zone according to a first percentage, where the first percentage indicates a ratio of the width of the secure zone to the width of the display device; and/or
calculating a height of the secure zone according to a second percentage, where the second percentage indicates a ratio of the height of the secure zone to the height of the display device.

Furthermore, the selecting a video frame from video images in response to playing the video images by the terminal may include:
selecting randomly at least one video frame from the video images in response to playing the video images by the terminal; or
selecting a specified video frame from the video images in response to playing the video images by the terminal, where the specified video frame is a video frame having a specified feature and selected by a predetermined method.

Furthermore, the generating a composite frame using parts of the video frame that are beyond the secure zone may include:
calculating a segmenting distance according to a size of the video frame and the size of the secure zone;
segmenting the video frame in a width direction and/or a height direction of the video frame according to the segmenting distance to obtain frame fragments; and
generating the composite frame by combining the frame fragments in the width direction, and/or generating the composite frame by combining the frame fragments in the height direction.

Furthermore, the judging whether the composite frame contains text may include:
inputting the composite frame to a text judgment model; and
judging whether the composite frame contains text according to an output of the text judgment model.

Furthermore, the text judgment model is obtained by training a convolutional neural network, where the convolutional neural network is trained as the text judgment model by inputting a set of training samples having classification labels to the convolutional neural network and supervising outputs of the convolutional neural network.

Furthermore, the determining that a subtitle in the video images is beyond scope if the composite frame contains text may include:

determining that the subtitle in the video images is beyond scope in a width direction and/or a height direction of the video images if the composite frame contains text.

Furthermore, the reducing a size of the subtitle to display the subtitle in the secure zone when determining that the subtitle in the video images is beyond scope may include:

when determining that the subtitle in the video images is beyond scope, scaling the subtitle to display all the subtitle in the secure zone; or scaling the video images to display all the subtitle in the secure zone.

According to another aspect of the present disclosure, the following technical solutions are provided.

An apparatus for processing a subtitle beyond scope includes:

a size acquiring module, configured to acquire size information of a display device of a terminal, where the size information indicates a size of the display device;

a secure zone establishing module, configured to establish a secure zone according to the size information, where the secure zone has a size less than or equal to the size of the display device;

a video frame selecting module, configured to select a video frame from video images in response to playing the video images by the terminal;

a composite frame generating module, configured to generate a composite frame using parts of the video frame that are beyond the secure zone;

a text judging module, configured to judge whether the composite frame contains text; and a beyond determining module, configured to determine that a subtitle in the video images is beyond scope if the composite frame contains text.

Furthermore, the apparatus may further include:

a scaling module, configured to reduce a size of the subtitle to display the subtitle in the secure zone when determining that the subtitle in the video images is beyond scope.

Furthermore, the size acquiring module may include:

a display attribute acquiring module, configured to acquire a display attribute of the terminal, where the display attribute includes a height of the display device and a width of the display device.

Furthermore, the secure zone establishing module may include:

a secure zone width calculation module, configured to calculate a width of the secure zone according to a first percentage, where the first percentage indicates a ratio of the width of the secure zone to the width of the display device; and/or a secure zone height calculation module, configured to calculate a height of the secure zone according to a second percentage, where the second percentage indicates a ratio of the height of the secure zone to the height of the display device.

Furthermore, the video frame selecting module may be configured to:

select randomly at least one video frame from the video images in response to playing the video images by the terminal; or select a specified video frame from the video images in response to playing the video images by the terminal, where the specified video frame is a video frame having a specified feature and selected by a predetermined method.

Furthermore, the composite frame generating module may include:

a segmenting distance calculating module, configured to calculate a segmenting distance according to a size of the video frame and the size of the secure zone;

a frame fragment obtaining module, configured to segment the video frame in a width direction and/or a height direction of the video frame according to the segmenting distance to obtain frame fragments; and a combining module, configured to generate the composite frame by combining the frame fragments in the width direction, and/or generate the composite frame by combining the frame fragments in the height direction.

Furthermore, the text judging module may include:

an inputting module, configured to input the composite frame to a text judgment model; and a judging module, configured to judge whether the composite frame contains text according to an output of the text judgment model.

Furthermore, the text judgment model may be obtained by training a convolutional neural network. The convolutional neural network is trained as the text judgment model by inputting a set of training samples having classification labels to the convolutional neural network and supervising outputs of the convolutional neural network.

Furthermore, the beyond determining module may include:

a beyond type determining module configured to determine that the subtitle in the video images is beyond scope in a width direction and/or a height direction of the video images if the composite frame contains text.

Furthermore, the scaling module may be further configured to when determining that the subtitle in the video images is beyond scope, scale the subtitle to display all the subtitle in the secure zone; or scale the video images to display all the subtitle in the secure zone.

According to another aspect of the present disclosure, the following technical solutions are provided.

An electronic device includes a memory storing non-transitory computer readable instructions, and a processor, configured to execute the computer readable instructions to perform steps of any of the above methods for processing a subtitle beyond scope.

According to another aspect of the present disclosure, the following technical solutions are provided.

A computer-readable storage medium stores non-transitory computer readable instructions, where the non-transitory computer readable instructions, when being executed by a computer, cause the computer to perform steps of any of the above methods for processing a subtitle beyond scope.

A method, an apparatus and an electronic device for processing a subtitle beyond scope are provided in the present disclosure. In the method for processing a subtitle beyond scope, size information of a display device of a terminal is acquired, where the size information indicates a size of the display device. A secure zone is established according to the size information, where the secure zone has a size less than or equal to the size of the display device. A video frame is selected from video images in response to playing the video images by the terminal. A composite frame is generated using parts of the video frame that are beyond the secure zone. It is judged whether the composite frame contains text. It is determined that a subtitle in the video images is beyond scope if the composite frame contains text. With the method for processing a subtitle beyond scope, by setting the secure zone and judging whether a frame fragment beyond the secure zone contains text, the existing problem of requiring human efforts to determine a subtitle beyond scope is solved.

The above description is only an overview of the technical solutions of the present disclosure. For better understanding of the technical solutions of the present disclosure and implementing the technical solutions according to the specification, and to make the above and other objectives, features and advantages of the technical solutions in the present disclosure clearer, the detailed description is provided below with reference to preferred embodiments and the accompanying drawings.

DETAILED DESCRIPTION

The embodiments of the present disclosure are described with examples, and those skilled in the art can easily understand other advantages and effects of the present disclosure from the content disclosed in this specification. Apparently, the described embodiments are only a part of the embodiments of the present disclosure, rather than all the embodiments. The present disclosure may be implemented or applied through other embodiments, and various details in this specification may be modified or changed based on different viewpoints and applications without departing from the spirit of the present disclosure. It should be noted that, in the case of no conflict, the following embodiments and the features in the embodiments can be combined with each other. Based on the embodiments in the present disclosure, all other embodiments obtained by those of ordinary skill in the art without creative work shall fall within the protection scope of the present disclosure.

It should be noted that various aspects of the embodiments within the scope of the appended claims are described below. Apparently, the aspects described herein can be embodied in a variety of forms, and any specific structure and/or function described herein are only illustrative. Based on the present disclosure, those skilled in the art should understand that any aspect described herein can be implemented independently of any other aspects, and two or more of these aspects can be combined in various ways. For example, any number of aspects set forth herein can be used to implement devices and/or methods in practices. In addition, structures and/or functionalities other than one or more of the aspects set forth herein may be used to implement the device and/or method.

It should also be noted that the illustrations provided in the following embodiments merely illustrate the basic concept of the present disclosure in a schematic manner. The figures only show components related to the present disclosure, rather than the actual number, shape, and size of the components in implementation. The type, quantity, and proportion of each component may be changed in actual implementations, and the component layout may be more complicated.

In addition, in the following description, specific details are provided to facilitate a thorough understanding of the examples. However, those skilled in the art will understand that the aspects can be practiced without these specific details.

Figure 2:
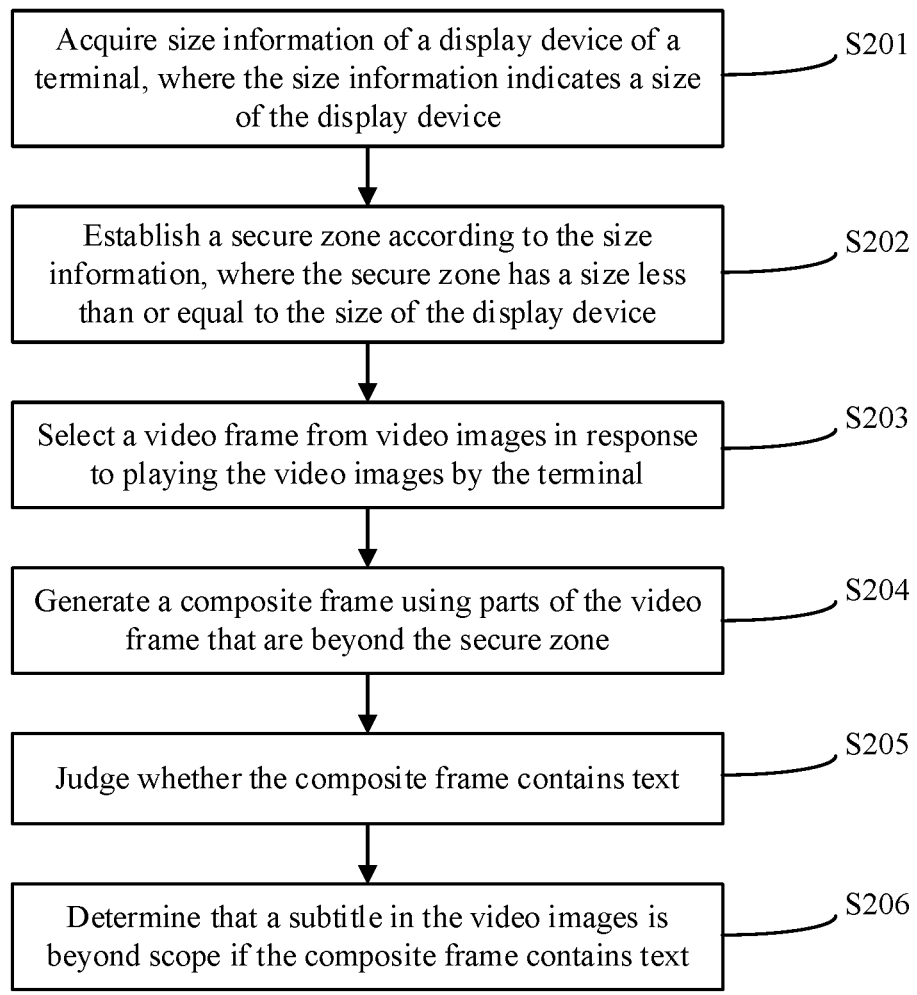
FIG. 2 is a flowchart of a method for processing a subtitle beyond scope according to an embodiment of the present disclosure.

A method for processing a subtitle beyond scope is provided according to an embodiment of the present disclosure. The method for processing a subtitle beyond scope provided in this embodiment may be executed by a computing device. The computing device may be implemented as software, or as a combination of software and hardware. The computing device may be integrated in a server, a terminal device, and the like. As shown in FIG. 2, the method for processing a subtitle beyond scope mainly includes the following steps S201 to S206.

In step S201, size information of a display device of a terminal is acquired, where the size information indicates a size of the display device.

In the present disclosure, the acquiring the size information of the display device of the terminal, where the size information indicates the size of the display device, may include: acquiring a display attribute of the terminal, where the display attribute includes a height and a width of the display device. For example, for a smart phone, the system information generally includes screen object attributes, which include the height and width of the screen of the smart phone, in the unit of pixel. For a terminal such as an ordinary mobile phone or a tablet computer, the resolution of the screen is fixed, so that the attribute of the screen object may be a constant. For an ordinary desktop computer and other terminals with adjustable screen resolution, the display attribute may be included in the system information, and can be read from the system information, which will not be described in details. The acquired size information of the display device may be N×M, where N is the width of the display device, M is the height of the display device, N≥1, and M≥1.

In step S202, a secure zone is established according to the size information, where the secure zone has a size less than or equal to the size of the display device.

In the present disclosure, the establishing a secure zone according to the size information, where the secure zone has a size less than or equal to the size of the display device may include: calculating a width of the secure zone according to a first percentage, where the first percentage indicates a ratio of the width of the secure zone to the width of the display device; and/or calculating a height of the secure zone according to a second percentage, where the second percentage indicates a ratio of the height of the secure zone to the height of the display device. For example, the first percentage and the second percentage may be preset at a fixed storage location, or may be set at any time by receiving a setting command from a user via a man-machine interface of the terminal. Assuming the first percentage is a % and the second percentage b %, where 0<a≤100, 0<b≤100, then the width of the secure zone n=N×a % and the height of the secure zone m=M×b %. Alternatively, in this step, only one of the width and height of the secure zone may be calculated. In the case of only calculating the width of the secure zone, the height of the secure zone may be directly set to be the same as the height in the size information. In the case of only calculating the width of the secure zone, the width of the secure zone may be directly set to be the same as the width in the size information.

It is understood that other methods may be used to establish the secure zone in this step. For example, the size of the secure zone may be directly set to be the same as the size of the display device, or a size offset of the secure zone relative to the display device may be directly set, which are not described in details. The secure zone defines the display zone of subtitles, so that the subtitles will not be displayed beyond the scope of the display device.

In step S203, a video frame is selected from video images in response to playing the video images by the terminal.

In the present disclosure, the selecting a video frame from video images in response to playing the video images by the terminal may include: selecting randomly at least one video frame from the video images in response to playing the video images by the terminal; or selecting a specified video frame from the video images in response to playing the video images by the terminal, where the specified video frame is a video frame having a specified feature and selected by a predetermined method. In this step, the selecting method for selecting the video frame from the video images includes random selection. The random selection may include randomly selecting a few consecutive frames, or randomly selecting a few frames at a fixed interval, or randomly selecting a few frames in sequence. The random selection method is not limited, and any random selection method can be used. Alternatively, a specified video frame may be selected. The specified video may be a video frame having a specified feature and selected using a predetermined method. For example, a text recognition model is used to recognize a video frame containing text, and the video frame containing text is selected from the video images.

In step S204, a composite frame is generated using parts of the video frame that are beyond the secure zone.

Figure 3:
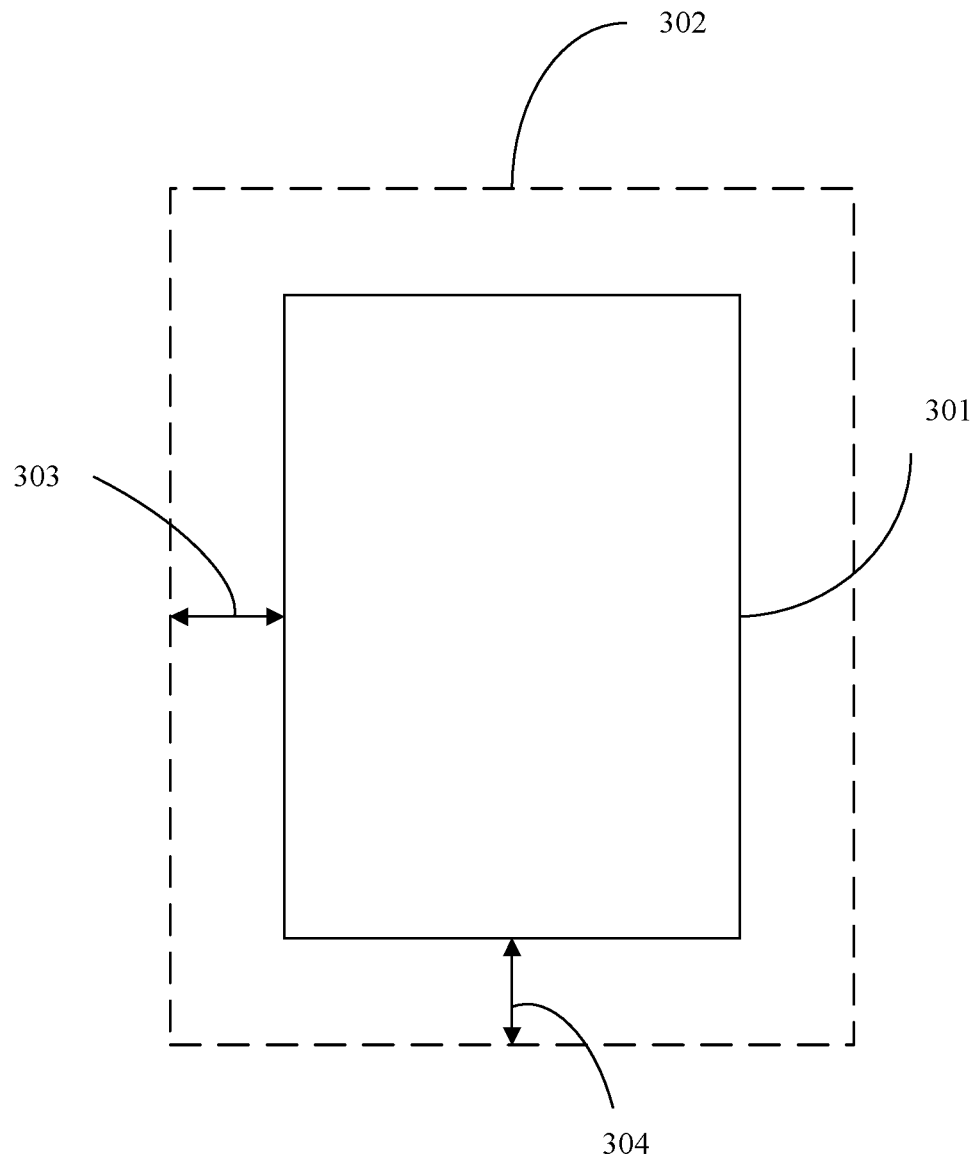
FIG. 3 is a schematic diagram of calculating a segmenting distance for taking a frame fragment according to an embodiment of the present disclosure.
Figure 4:
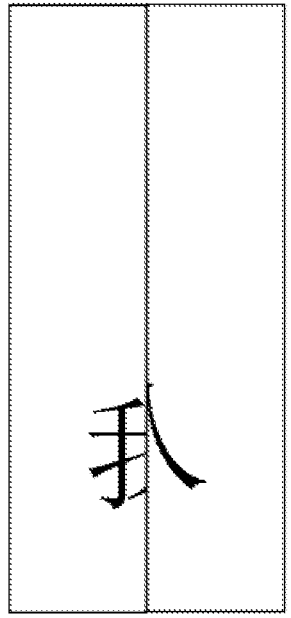
FIG. 4 is a schematic diagram of a composite frame according to an embodiment of the present disclosure.

In the present disclosure, the generating a composite frame using parts of the video frame that are beyond the secure zone may include: calculating a segmenting distance according to a size of the video frame and the size of the secure zone; segmenting the video frame in a width direction and/or a height direction of the video frame according to the segmenting distance to obtain frame fragments, and generating the composite frame by combining the frame fragments in the width direction and/or generating the composite frame by combining the frame fragments in the height direction. In this step, the calculating a segmenting distance according to a size of the video frame and the size of the secure zone may include: directly subtracting the width of the secure zone from the width of the video frame, and subtracting the height of the secure zone from the height of the video frame. For example, as shown in FIG. 3, assuming that the size of the video frame 301 is 700×1080 and the size of the secure zone 302 is 540×960, the segmenting distance 303 in the width direction is calculated as (700−540)/2=80, and the segmenting distance in the height direction 304 is calculated as (1080−960)/2=60. Alternatively, the calculating a segmenting distance according to a size of the video frame and the size of the secure zone may include: calculating the segmenting distance by using the result of sub-tracting the width of the secure zone from the width of the video frame as a threshold. Taking the above example in FIG. 3, 80 is used as the maximum value of the segmenting distance in the width direction, and 60 is used as the maximum value of the segmenting distance in the height direction, to calculate the segmenting distance in the width direction and the segmenting distance in the height direction. For example, for each segmenting distance, if 50% of the maximum value of the segmenting distance is taken as the segmenting distance, the segmenting distance in the width direction is 40, and the segmenting distance in the height direction is 30. After the segmenting distance is obtained through the above steps, the frame fragments are taken in the width direction and/or height direction of the video frame according to the segmenting distance, and the frame fragments in the width direction are combined to generate a composite frame and/or, the frame fragments in the height direction are combined to generate a composite frame. That is, two frame fragments taken in the width direction are combined to generate a composite frame, and two frame fragments taken in the height direction are combined into a composite frame. As shown in FIG. 4, a composite frame in the width direction is shown, where the left frame fragment includes a part of the text 我 (Chinese word for "I"), and the right frame fragment includes a part of the text 人 (Chinese word for "man"). It is understood that FIG. 4 only shows the composite frame in the width direction. A composite frame in the height direction is similar, where an upper frame fragment and a lower frame fragments are combined, which is not described in detail herein. It is understood that although the frame fragments of the composite frame shown in FIG. 4 includes a text, the frame fragments in the composite frame may not include any text in the case that the subtitle is not beyond the scope, which is not described in detail herein.

In step S205, it is judged whether the composite frame contains text.

In the present disclosure, the judging whether the composite frame contains text may include: inputting the composite frame to a text judgment model; and judging whether the composite frame contains text according to an output of the text judgment model. The text judgment model may be obtained by training a convolutional neural network. The convolutional neural network is trained as the text judgment model by inputting a set of training samples having classification labels to the convolutional neural network and supervising outputs of the convolutional neural network. In this step, the pre-trained convolutional neural network is used to judge whether the composite frame contains text. The convolutional neural network may be any variation of a convolutional application network, which is not limited herein. In training the model, a training set is firstly acquired. The training set includes composite frame pictures having labels, such as multiple images as shown in FIG. 4 are labeled as containing text. The pictures in the training set are inputted to the convolutional neural network, and outputted through the sigmoid function. The output results are compared with the labels. If an output is correct, the parameters of the current convolutional neural network are saved. Otherwise, it is fed back to the convolutional neural network so that the convolutional neural network adjusts its parameters. The pictures are continuously inputted to repeat the above steps until the parameters that adapt to all the pictures in the training set are obtained. At this point, the training ends, and the text judgment model is formed. In this step, the composite frame generated in step S204 is inputted into the text judgment model, and it is judged whether the composite frame contains text according to the output of the model. Optionally, when the model outputs 1, it is determined that the composite frame contains text, and when the model outputs 0, it is determined that the composite frame contains no text.

It is understood that the above embodiment of judging whether the composite frame contains text is only an example. In practices, any method that can judge whether a picture contains text can be applied to the technical solution of the present disclosure, which is not described in detail herein.

In step S206, it is determined that a subtitle in the video images is beyond scope if the composite frame contains text.

In the present disclosure, determining that a subtitle in the video images is beyond scope if the composite frame contains text may include: determining that the subtitle in the video images is beyond scope in a width direction and/or a width direction of the video images if the composite frame contains text. In this step, if the result obtained in step S205 is that the composite frame contains text, it is determined that the subtitle in the images is beyond scope. Further, according to whether the composite frame is a composite frame in the width direction or in the height direction, it is determined whether the subtitle is beyond scope in the width direction or the height direction of the video images.

A method, an apparatus and an electronic device for processing a subtitle beyond scope are provided in the present disclosure. In the method for processing a subtitle beyond scope, size information of a display device of a terminal is acquired, where the size information indicates a size of the display device. A secure zone is established according to the size information, where the secure zone has a size less than or equal to the size of the display device. A video frame is selected from video images in response to playing the video images by the terminal. A composite frame is generated using parts of the video frame that are beyond the secure zone. It is judged whether the composite frame contains text. It is determined that a subtitle in the video images is beyond scope if the composite frame contains text. With the method for processing a subtitle beyond scope, by setting the secure zone and judging whether a frame fragment beyond the secure zone contains text, the existing problem of requiring human efforts to determine a subtitle beyond scope is solved.

Figure 5:
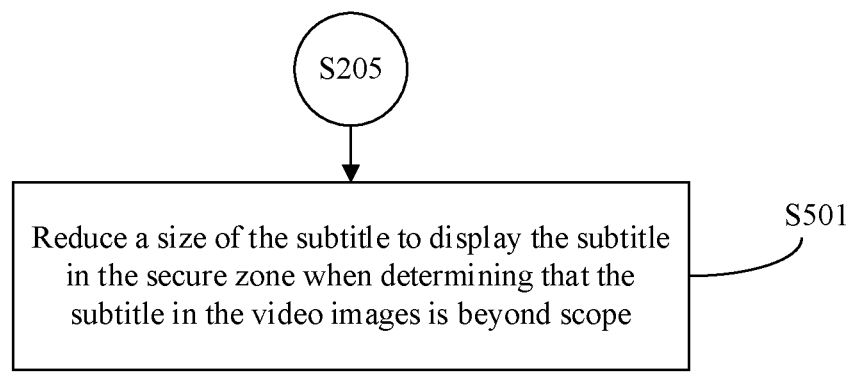
FIG. 5 is a flowchart of a method for processing a subtitle beyond scope according to an embodiment of the present disclosure.

As shown in FIG. 5, the method for processing a subtitle beyond scope may further includes step S501.

In step S501, a size of the subtitle is reduced to display the subtitle in the secure zone when determining that the subtitle in the video images is beyond scope.

The reducing a size of the subtitle to display the subtitle in the secure zone when determining that the subtitle in the video images is beyond scope may include: when determining that the subtitle in the video images is beyond scope, scaling the subtitle to display all the subtitle in the secure zone; or scaling the video images to display all the subtitle in the secure zone. This step is automatically performed after determining that the subtitle in the video images is beyond scope. When determining that the subtitle in the video images is beyond scope, the subtitle is reduced until the subtitle is all located in the secure zone. The size of the subtitle may be reduced by two ways. One way is to reduce the subtile directly, which is used generally in the case that the subtitle file is separated from the video images, that is, the subtitle is a plug-in subtitle. The display position, font, size and color of the subtitles can be configured through a configuration file. In this case, since the width and height of the secure zone are known, the display position and/or size in the subtitle file may be configured according to the width and height of the secure zone to zoom the subtitles into the secure zone. The other way is to directly scale the video. Sometimes the subtitles and the video are integrated together. In this case, the subtitles are parts of the video images, and cannot be scaled separately. Therefore, the video images may be scaled to the size of the secure zone so that the subtitles are surely located in the secure zone, thereby solving the problem of subtitles beyond scope.

It is understood that the above two methods of reducing the size of the subtitles to the secure zone are examples, and other methods that can directly or indirectly scale the subtitles can be applied, which is not described in detail herein.

In the above, although the steps in the above method embodiments are described in the above order, those skilled in the art should understand that the steps in the embodiments of the present disclosure are not necessarily executed in the above order, and they may be performed in a reversed, parallel, or interleaved order. Other steps may be added to the above steps by those skilled in the art. These obvious modifications or equivalent substitutions should also be included in the protection scope of the present disclosure, and will not be described in detail herein.

The followings are device embodiments of the present disclosure. The device embodiments of the present disclosure may be used to perform the steps in the method embodiments of the present disclosure. For ease of description, only the parts related to the embodiments of the present disclosure are shown. For specific details that are not described, one may refer to the method embodiments of the present disclosure.

Figure 6:
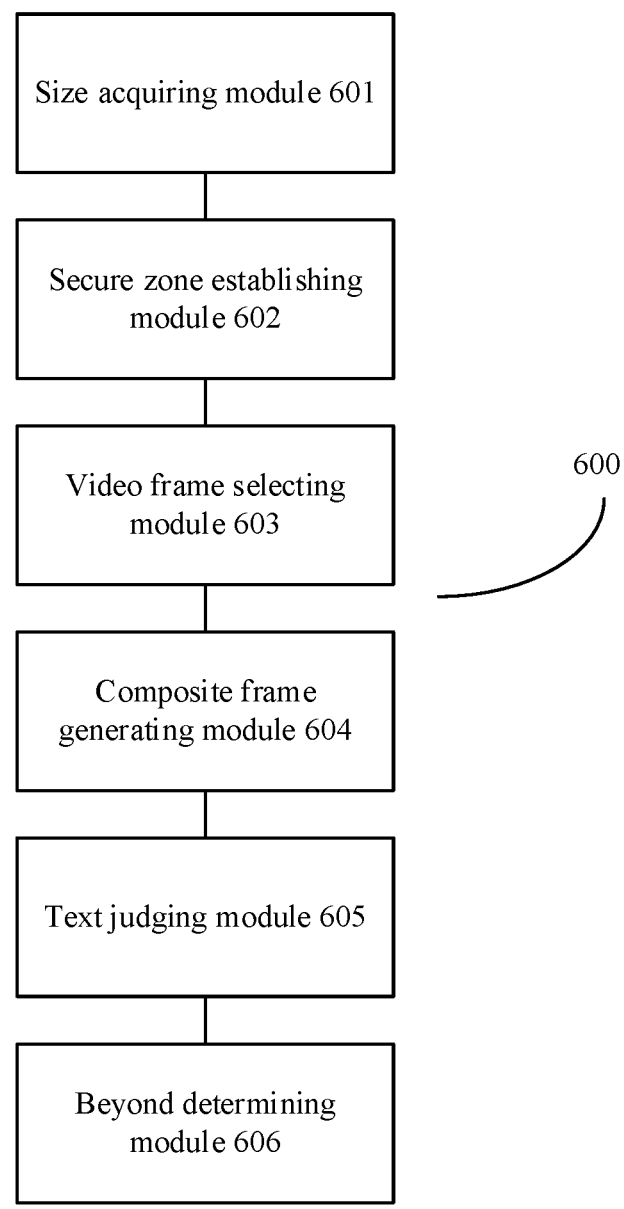
FIG. 6 is a schematic structural diagram of an apparatus for processing a subtitle beyond scope according to an embodiment of the present disclosure.

An apparatus for processing a subtitle beyond scope is provided according to an embodiment of the present disclosure. The apparatus may perform steps of the method for processing a subtitle beyond scope provided in the above embodiments. As shown in FIG. 6, the apparatus 600 may include: a size acquiring module 601, a secure zone establishing module 602, a video frame selecting module 603, a composite frame generating module 604, a text judging module 605, and a beyond determining module 606.

The size acquiring module 601 is configured to acquire size information of a display device of a terminal, where the size information indicates a size of the display device.

The secure zone establishing module 602 is configured to establish a secure zone according to the size information, where the secure zone has a size less than or equal to the size of the display device.

The video frame selecting module 603 is configured to select a video frame from video images in response to playing the video images by the terminal.

The composite frame generating module 604 is configured to generate a composite frame using parts of the video frame that are beyond the secure zone.

The text judging module 605 is configured to judge whether the composite frame contains text.

The beyond determining module 606 is configured to determine that a subtitle in the video images is beyond scope if the composite frame contains text.

Further, the apparatus 600 may include a scaling module configured to reduce a size of the subtitle to display the subtitle in the secure zone when determining that the subtitle in the video images is beyond scope.

Further, the size acquiring module 601 may include a display attribute acquiring module configured to acquire a display attribute of the terminal, where the display attribute includes a height of the display device and a width of the display device.

Further, the secure zone establishing module 602 may include a secure zone width calculation module and/or a secure zone height calculation module.

The secure zone width calculation module is configured to calculate a width of the secure zone according to a first percentage, where the first percentage indicates a ratio of the width of the secure zone to the width of the display device.

The secure zone height calculation module is configured to calculate a height of the secure zone according to a second percentage, where the second percentage indicates a ratio of the height of the secure zone to the height of the display device.

Further, the video frame selecting module 603 may be further configured to, in response to playing the video images by the terminal, select randomly at least one video frame from the video images, or select a specified video frame from the video images, where the specified video frame is a video frame having a specified feature and selected by a predetermined method.

Further, the composite frame generating module 604 may include:
  a segmenting distance calculating module, configured to calculate a segmenting distance according to a size of the video frame and the size of the secure zone;
  a frame fragment obtaining module, configured to segment the video frame in a width direction and/or a height direction of the video frame according to the segmenting distance to obtain frame fragments; and a combining module, configured to generate the composite frame by combining the frame fragments in the width direction, and/or generate the composite frame by combining the frame fragments in the height direction.

Further, the text judging module 605 may include:
  an inputting module, configured to input the composite frame to a text judgment model; and
  a judging module, configured to judge whether the composite frame contains text according to an output of the text judgment model.

Further, the text judgment model may be obtained by training a convolutional neural network. The convolutional neural network is trained as the text judgment model by inputting a set of training samples having classification labels to the convolutional neural network and supervising outputs of the convolutional neural network.

Further, the beyond determining module 606 may include a beyond type determining module configured to determine that the subtitle in the video images is beyond scope in a width direction and/or a height direction of the video images if the composite frame contains text.

Further, the scaling module may be further configured to, when determining that the subtitle in the video images is beyond scope, scale the subtitle to display all the subtitle in the secure zone or scale the video images to display all the subtitle in the secure zone.

Figure 1:
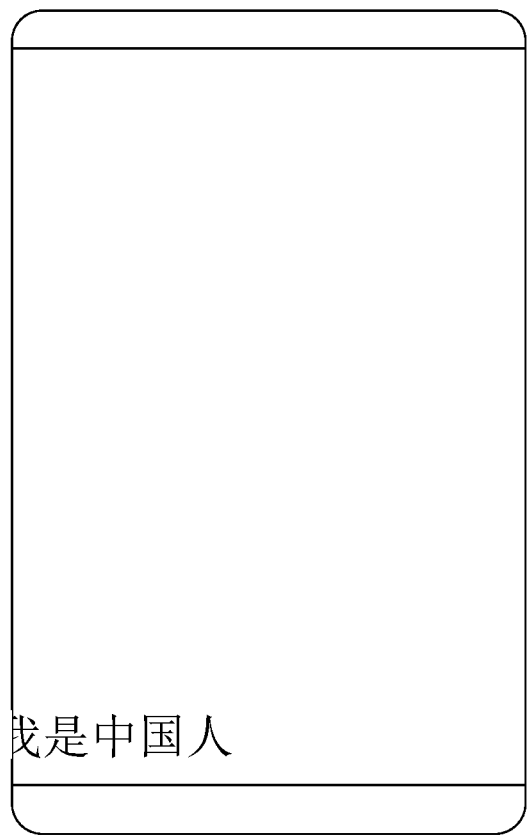
FIG. 1 is a schematic diagram showing a subtitle beyond scope of a display screen in the conventional technology.

The apparatus shown in FIG. 6 can perform the methods of the embodiments shown in FIGS. 1 and 5. For parts that are not described in detail in this embodiment, reference may be made to the related descriptions of the embodiments shown in FIGS. 1 and 5. For the implementation process and technical effects of this technical solution, one may refer to the description of the embodiments shown in FIGS. 1 and 5, which will not be repeated here.

Figure 7:
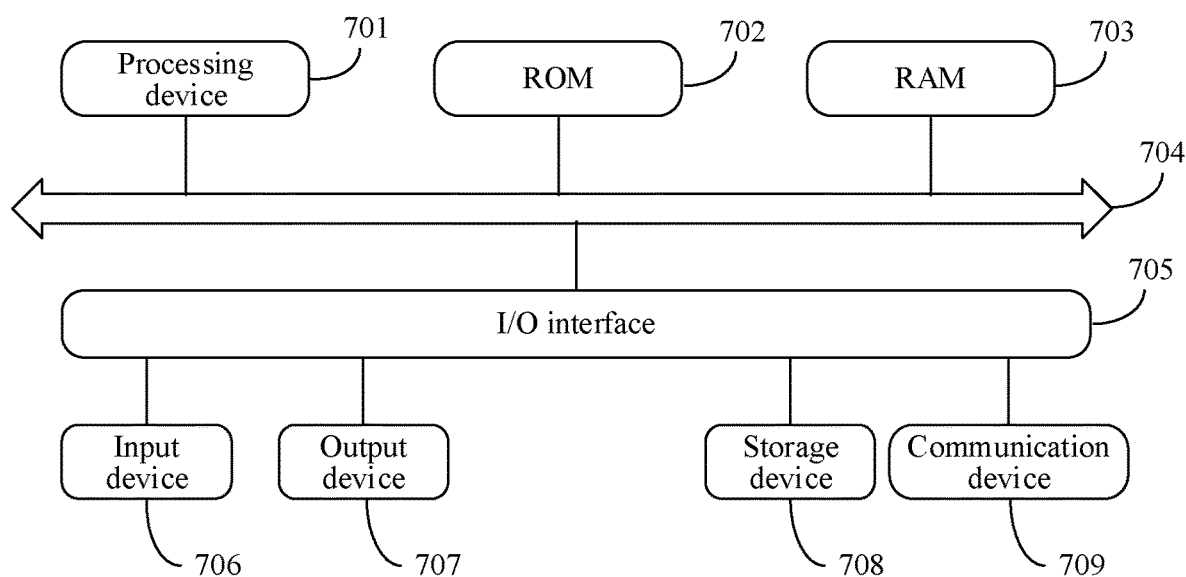
FIG. 7 is a schematic structural diagram of an electronic device according to an embodiment of the present disclosure.

FIG. 7 shows a schematic structural diagram of an electronic device 700 suitable for implementing the embodiments of the present disclosure. The electronic devices in the embodiments of the present disclosure may include, but are not limited to, mobile terminals such as mobile phones, notebook computers, digital broadcast receivers, PDAs (personal digital assistants), PADs (tablets), PMPs (portable multimedia players) and vehicle-mounted terminals (for example, vehicle navigation terminals), and fixed terminals such as digital TVs, desktop computers. The electronic device shown in FIG. 7 is only an example, rather than a limitation to the function and scope of use of the embodiments of the present disclosure.

As shown in FIG. 7, the electronic device 700 may include a processing device (such as a central processing unit, a graphics processor, etc.) 701, which may executes various appropriate actions and processes using programs stored in a read-only memory (ROM) 702 or loaded into a random access memory (RAM) 703 from a storage device 708. The RAM 703 further stores various programs and data required for the operation of the electronic device 700. The processing device 701, the ROM 702, and the RAM 703 are connected to each other through a bus 704. An input/output (I/O) interface 705 is also connected to the bus 704.

Generally, the following devices may be connected to the I/O interface 705: an input device 706 such as a touch screen, a touch panel, a keyboard, a mouse, an image sensor, a microphone, an accelerometer, and a gyroscope; an output device 707 such as a liquid crystal display (LCD), a speaker, and a vibrator; a storage device 708 such as a magnetic tape and a hard disk; and a communication device 709. The communication device 709 may allow the electronic device 700 to perform wireless or wired communication with other devices to exchange data. Although FIG. 4 shows an electronic device 700 having various components, it should be understood that it is not required to have all of the illustrated components. It may alternatively be provided with more or fewer components.

In particular, according to an embodiment of the present disclosure, the process described above with reference to the flowchart may be implemented as a computer software program. For example, an embodiment of the present disclosure includes a computer program product, which includes a computer program carried on a computer-readable medium. The computer program contains program codes for executing the method shown in the flowchart. In such an embodiment, the computer program may be downloaded and installed from the network through the communication device 709, or installed from the storage device 708, or installed from the ROM 702. When the computer program is executed by the processing device 701, the above-mentioned functions defined in the method of the embodiments of the present disclosure are executed.

It should be noted that the aforementioned computer-readable medium in the present disclosure may be a computer-readable signal medium or a computer-readable storage medium, or any combination thereof. The computer-readable storage medium may be, for example but not limited to, an electrical, magnetic, optical, electromagnetic, infrared, or semiconductor system, device, or device, or a combination of any of the above. More specific examples of computer-readable storage media may include, but are not limited to: a electrical connection with one or more wires, a portable computer disk, a hard disk, a random access memory (RAM), a read-only memory (ROM), an Erasable Programmable Read-only Memory (EPROM or flash memory), an optical fiber, a portable compact disk read-only memory (CD-ROM), a optical storage device, a magnetic storage device, or any suitable combination of the above. In the present disclosure, the computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal may be in any forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained in the computer-readable medium can be transmitted by any suitable medium, including but not limited to: a wire, an optical cable, RF (Radio Frequency), or any suitable combination of the above.

The above-mentioned computer-readable medium may be included in the above-mentioned electronic device, or may exist alone without being assembled into the electronic device.

The above-mentioned computer-readable medium carries one or more programs. When the above-mentioned one or more programs are executed by the electronic device, cause the electronic device to: acquire size information of a display device of a terminal, where the size information indicates a size of the display device; establish a secure zone according to the size information, where the secure zone has a size less than or equal to the size of the display device; select a video frame from video images in response to playing the video images by the terminal; generate a composite frame using parts of the video frame that are beyond the secure zone; judge whether the composite frame contains text; and determine that a subtitle in the video images is beyond scope if the composite frame contains text.

The computer program code used to perform the operations of the present disclosure may be written in one or more programming languages or a combination thereof. The above-mentioned programming languages include object-oriented programming languages, such as Java, Smalltalk, C++, and conventional procedural programming language, such as "C" language or a similar programming language. The program code may be executed entirely or partly on a user computer, or executed as an independent software package, or executed partly on the user's computer and partly on a remote computer, or entirely executed on the remote computer or a server. In the case of involving a remote computer, the remote computer may be connected to the user computer through any kind of network, including a local area network (LAN) or a wide area network (WAN), or may be connected to an external computer (for example, using the Internet provided by an Internet service provider).

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code. The module, program segment, or part of code contains one or more executable instructions for realizing the specified logic function. It should also be noted that, in some alternative implementations, the functions in the blocks may also be performed in a different order from the order shown in the drawings. For example, two blocks shown in succession may actually be executed substantially in parallel, or may be executed in the reverse order, depending on the functions involved. It should also be noted that each block in the block diagram and/or flowchart, and the combination of the blocks in the block diagram and/or flowchart, may be implemented by a dedicated hardware-based system that performs the specified functions or operations, or may be realized by a combination of dedicated hardware and computer instructions.

The units in the embodiments described in the present disclosure may be implemented in software or hardware. The name of each unit does not constitute a limitation on the unit.

The above only describes preferred embodiments of the present disclosure and their technical principles. Those skilled in the art should understand that the scope of disclosure is not limited to the technical solutions formed by the specific combination of the above technical features, and should also cover the technical solutions formed by any combination of the above technical features and their equivalents without departing from the above disclosed concept. For example, the above-mentioned features and the technical features having similar functions to the disclosed functions in the present disclosure (but not limited to) are replaced with each other to form a technical solution.

The invention claimed is:

1. A method for processing a subtitle beyond scope, comprising:
    acquiring size information of a display device of a terminal, wherein the size information indicates a size of the display device;
    establishing a secure zone according to the size information, wherein the secure zone has a size less than or equal to the size of the display device;
    selecting a video frame from video images in response to playing the video images by the terminal;
    generating a composite frame using parts of the video frame that are beyond the secure zone;
    judging whether the composite frame contains text; and
    determining that a subtitle in the video images is beyond scope if the composite frame contains text.

2. The method for processing a subtitle beyond scope according to claim 1, further comprising:
    reducing a size of the subtitle to display the subtitle in the secure zone when determining that the subtitle in the video images is beyond scope.

3. The method for processing a subtitle beyond scope according to claim 1, wherein the acquiring size information of a display device of a terminal, wherein the size information indicates a size of the display device comprises:
    acquiring a display attribute of the terminal, wherein the display attribute comprises a height of the display device and a width of the display device.

4. The method for processing a subtitle beyond scope according to claim 3, wherein the establishing a secure zone according to the size information, wherein the secure zone has a size less than or equal to the size of the display device comprises:
    calculating a width of the secure zone according to a first percentage, wherein the first percentage indicates a ratio of the width of the secure zone to the width of the display device; and/or
    calculating a height of the secure zone according to a second percentage, wherein the second percentage indicates a ratio of the height of the secure zone to the height of the display device.

5. The method for processing a subtitle beyond scope according to claim 1, wherein the selecting a video frame from video images in response to playing the video images by the terminal comprises:
selecting randomly at least one video frame from the video images in response to playing the video images by the terminal; or
selecting a specified video frame from the video images in response to playing the video images by the terminal, wherein the specified video frame is a video frame having a specified feature and selected by a predetermined method.

6. The method for processing a subtitle beyond scope according to claim 1, wherein the generating a composite frame using parts of the video frame that are beyond the secure zone comprises:
calculating a segmenting distance according to a size of the video frame and the size of the secure zone;
segmenting the video frame in a width direction and/or a height direction of the video frame according to the segmenting distance to obtain frame fragments; and
generating the composite frame by combining the frame fragments in the width direction, and/or generating the composite frame by combining the frame fragments in the height direction.

7. The method for processing a subtitle beyond scope according to claim 1, wherein the judging whether the composite frame contains text comprises:
inputting the composite frame to a text judgment model; and
judging whether the composite frame contains text according to an output of the text judgment model.

8. The method for processing a subtitle beyond scope according to claim 7, wherein the text judgment model is obtained by training a convolutional neural network, wherein the convolutional neural network is trained as the text judgment model by inputting a set of training samples having classification labels to the convolutional neural network and supervising outputs of the convolutional neural network.

9. The method for processing a subtitle beyond scope according to claim 6, wherein the determining that a subtitle in the video images is beyond scope if the composite frame contains text comprises:
determining that the subtitle in the video images is beyond scope in a width direction and/or a height direction of the video images if the composite frame contains text.

10. The method for processing a subtitle beyond scope according to claim 2, wherein the reducing a size of the subtitle to display the subtitle in the secure zone when determining that the subtitle in the video images is beyond scope comprises:
when determining that the subtitle in the video images is beyond scope,
scaling the subtitle to display all the subtitle in the secure zone; or
scaling the video images to display all the subtitle in the secure zone.

11. An apparatus for processing a subtitle beyond scope, comprising:
at least one processor; and
at least one memory communicatively coupled to the at least one processor and storing instructions that upon execution by the at least one processor cause the apparatus to perform operations comprising:
acquiring size information of a display device of a terminal, wherein the size information indicates a size of the display device;
establishing a secure zone according to the size information, wherein the secure zone has a size less than or equal to the size of the display device;
selecting a video frame from video images in response to playing the video images by the terminal;
generating a composite frame using parts of the video frame that are beyond the secure zone;
judging whether the composite frame contains text; and
determining that a subtitle in the video images is beyond scope if the composite frame contains text.

12. A non-transitory computer-readable storage medium, storing computer readable instructions, wherein the computer readable instructions, when being executed by a computer, cause the computer to perform the method for processing a subtitle beyond scope according to claim 1.

13. The apparatus according to claim 11, the operations further comprising:
reducing a size of the subtitle to display the subtitle in the secure zone when determining that the subtitle in the video images is beyond scope.

14. The apparatus according to claim 11, the operations further comprising:
acquiring a display attribute of the terminal, wherein the display attribute comprises a height of the display device and a width of the display device.

15. The apparatus according to claim 14, the operations further comprising:
calculating a width of the secure zone according to a first percentage, wherein the first percentage indicates a ratio of the width of the secure zone to the width of the display device; and/or
calculating a height of the secure zone according to a second percentage, wherein the second percentage indicates a ratio of the height of the secure zone to the height of the display device.

16. The apparatus according to claim 11, the operations further comprising:
selecting randomly at least one video frame from the video images in response to playing the video images by the terminal; or
selecting a specified video frame from the video images in response to playing the video images by the terminal, wherein the specified video frame is a video frame having a specified feature and selected by a predetermined method.

17. The apparatus according to claim 11, the operations further comprising:
calculating a segmenting distance according to a size of the video frame and the size of the secure zone;
segmenting the video frame in a width direction and/or a height direction of the video frame according to the segmenting distance to obtain frame fragments; and
generating the composite frame by combining the frame fragments in the width direction, and/or generating the composite frame by combining the frame fragments in the height direction.

18. The apparatus according to claim 11, the operations further comprising:
inputting the composite frame to a text judgment model; and
judging whether the composite frame contains text according to an output of the text judgment model.

19. The apparatus according to claim 18, wherein the text judgment model is obtained by training a convolutional neural network, wherein the convolutional neural network is trained as the text judgment model by inputting a set of training samples having classification labels to the convolutional neural network and supervising outputs of the convolutional neural network.

20. The apparatus according to claim 17, the operations further comprising:
  determining that the subtitle in the video images is beyond scope in a width direction and/or a height direction of the video images if the composite frame contains text.

* * * * *